US007828009B2

(12) United States Patent
Neumann et al.

(10) Patent No.: US 7,828,009 B2
(45) Date of Patent: Nov. 9, 2010

(54) PRESSURE REDUCING REGULATOR WITH ADJUSTABLE FEATURE

(75) Inventors: Eric W. Neumann, Princeton, MN (US); Todd W. Larsen, Milaca, MN (US)

(73) Assignee: Tescom Corporation, Elk River, MN (US)

( * ) Notice: Subject to any disclaimer, the term of this patent is extended or adjusted under 35 U.S.C. 154(b) by 416 days.

(21) Appl. No.: 11/683,620

(22) Filed: Mar. 8, 2007

(65) Prior Publication Data

US 2007/0209703 A1    Sep. 13, 2007

Related U.S. Application Data

(60) Provisional application No. 60/781,243, filed on Mar. 10, 2006.

(51) Int. Cl.
G05D 16/10 (2006.01)
(52) U.S. Cl. .................................. 137/505.25; 137/508
(58) Field of Classification Search ............ 137/505.25, 137/505.28, 508
See application file for complete search history.

(56) References Cited

U.S. PATENT DOCUMENTS

| 1,606,803 | A | * | 11/1926 | Lalor | 137/505.28 |
| 2,219,408 | A | * | 10/1940 | Bens et al. | 137/505.25 |
| 3,890,999 | A | * | 6/1975 | Moskow | 137/505.25 |
| 4,476,888 | A | | 10/1984 | Lachmann et al. | 137/102 |
| 4,667,695 | A | | 5/1987 | Gold et al. | 137/486 |
| 5,251,655 | A | | 10/1993 | Low | 137/501 |
| 5,501,247 | A | | 3/1996 | Miller | 137/316 |
| 2004/0007269 | A1 | | 1/2004 | Larsen | 137/505.25 |
| 2004/0216781 | A1 | | 11/2004 | Larsen | 137/505.25 |

OTHER PUBLICATIONS

European Office Action for corresponding Application No. 07752673.9, dated Apr. 3, 2009.
International Search Report issued in PCT/US20007/005990 application mailed Sep. 4, 2007.
Written Opinion issued in PCT/US2007/005990 application mailed Sep. 4, 2007.

* cited by examiner

*Primary Examiner*—Stephen Hepperle
(74) *Attorney, Agent, or Firm*—Marshall, Gerstein & Borun LLP

(57) ABSTRACT

The present disclosure is directed to a flow control device, such as a regulator, for controlling fluid flow between an inlet port and an outlet port, and having an internal adjustment mechanism for varying the outlet pressure of the device, including the pressure required to close the device. The device may include first and second components, such as a body and a bonnet, demountably attached to form a housing of the device and defining an internal device cavity. A piston is disposed and movable within the device cavity, and in fluid sealing relationship with the inner surface of the device cavity. The components and the piston are configured to define a channel within the device cavity placing the inlet port in fluid communication with the outlet port, and with the piston being movable between a closed position preventing fluid flow and an open position allowing fluid flow to the outlet port. The internal adjustment mechanism may be in the form of a wheel that may be rotated in either direction to increase or decrease the outlet pressure at which the piston will move to the closed position. A vent port offset from the longitudinal axis of the housing may provide access to the interior of the device for manipulation of the adjustment mechanism.

31 Claims, 6 Drawing Sheets

PRESSURE REDUCING REGULATOR WITH ADJUSTABLE FEATURE

CROSS-REFERENCE TO RELATED APPLICATION

This application is based on U.S. Provisional Patent Application Ser. No. 60/781,243, filed Mar. 10, 2006, the entirety of which is hereby incorporated by reference herein.

FIELD OF TECHNOLOGY

The present invention relates generally to in-line flow control devices such as pressure reducing regulators and, more particularly, to a pressure reducing regulator having an adjustment mechanism for varying the outlet pressure, including the pressure required to close the regulator.

DESCRIPTION OF THE RELATED ART

Flow control devices such as pressure reducing regulators are generally known in the art. For example, U.S. Pat. No. 4,476,888 to Lachmann et al. discloses an overpressure-control valve having a valve housing formed with a front output chamber, a back intake chamber adjacent and back of the output chamber, and a valve seat lying between the chambers. A valve body can move in the housing forward toward the valve seat into a closing position on the seat and blocking flow between the chambers and backward from the valve seat and into an open position permitting flow between the chambers. The body has at least one forwardly directed face and at least one backwardly directed face exposed in the chambers. The effective surface area of the forwardly directed face is greater than that of the backwardly directed face. A spring urges the valve forward into the open position with a predetermined generally constant biasing force so that the valve body moves back against the spring into the closed position when the backwardly effective pressure on the forward face overcomes both the force of the spring and the pressure on the back face.

U.S. Pat. No. 4,667,695 to Gold discloses a two stage relief valve in which the pilot flow is limited by an active flow control element to a specific maximum predetermined level to extend its maximum operating pressure range and to improve its operating characteristics. The downstream orifice may be fully open and of a fixed area type, or may be controlled by a spring or solenoid biased member. With the downstream orifice solenoid or stepper motor operated, the relief pressure level becomes responsive to an electrical input signal.

U.S. Pat. No. 5,501,247 to Miller discloses, in a fluid pressure regulator, the combination comprising a body forming a cavity and a cap on the body extending over the cavity, the cap and body carrying interengaging threads allowing rotary make-up of the cap on the body, a diaphragm in the cavity and seated on a ledge formed by the body thereby to form a seal, a pressure transmitting element in the cavity to transmit cap pressure to the seal, with the body having flow porting and there being a poppet in the body and movable to control fluid flow via the porting, a spring in the cap and structure in the cavity and axially movable to transmit spring pressure to the diaphragm, the poppet carried for axial movement with the structure, and blocking means to block relative rotary movement between the pressure transmitting element and at least one of the body and the structure.

U.S. Patent Publication No. 2004/0216781 to Larsen discloses an inline flow control device including a housing with a tubular portion coaxially aligned with the tubular portion of a fitting threaded to the housing. A piston has a bore extending therethrough with the tubular portions extended thereinto in axial spaced relationship, the fitting tubular portion mounting a valve seat to abut against a piston internal shoulder when the piston has axially moved relative to the tubular portions to a blocking position to block fluid flow through the device. The piston enlarged diametric portion bottom surface is in fluid communication with the piston bore in both of the piston positions but not in fluid communication with the body high pressure inlet when the piston is in its blocking position. A spring resiliently urges the piston in its blocking position. Two embodiments are pressure regulators while the third is a balanced valve.

SUMMARY

In one aspect, the invention is directed to a flow control device having an internal adjustment mechanism for varying the outlet pressure of the device, including the pressure required to close the device. The device may include first and second components, such as a body and a bonnet, demountably attached to form a housing of the device and defining an internal device cavity. One of the components includes an inlet port for receiving pressurized fluid from a fluid source attached thereto, and the same component or the other of the components includes an outlet port for discharging pressurized fluid. A piston is disposed and movable within the device cavity, and in fluid sealing relationship with the inner surface of the device cavity. The components and the piston are configured to define a channel within the device cavity placing the inlet port in fluid communication with the outlet port, and to dispose a valve seat within the channel such that the piston moves between a closed position wherein an inner surface of the piston and gauges of the valve seat to prevent fluid flow to the outlet port, and an open position wherein the inner surface of the piston is disengaged from the valve seat to allow fluid flow to the outlet port. The piston is further configured so that a surface of the piston is in fluid communication with the outlet port such that increasing pressure at the outlet port causes an increase in the force applied by the pressurized fluid on the surface of the piston in the direction from the open position to the closed position.

The flow control device further includes a spring biasing the piston from the closed to the open position, and a wheel, gear or similar component having and internally threaded bore disposed on a cylindrical member within the device cavity and engaging the spring such that rotation of the wheel or gear in one direction moves the wheel axially along the cylindrical member to compress the spring and increase the outlet pressure necessary to move the piston from the open position to the closed position, and rotation of the wheel or gear in the opposite direction moves the wheel axially along the cylindrical member to decompress the spring and decrease the outlet pressure necessary to move the piston from the open position to the closed position. The flow control device may further include a bore extending inwardly from the outer surface of the housing and intersecting the device cavity proximate the wheel or gear so that a surface of the wheel or gear may be engaged, such as by an appropriate adjustment tool, to rotate the wheel or gear in either direction. In one embodiment, a longitudinal axis of the bore is oriented parallel to and offset from a longitudinal axis of the device.

DETAILED DESCRIPTION

Although the following text sets forth a detailed description of numerous different embodiments of the invention, it should be understood that the legal scope of the invention is defined by the words of the claims set forth at the end of this patent. The detailed description is to be construed as exemplary only and does not describe every possible embodiment of the invention since describing every possible embodiment would be impractical, if not impossible. Numerous alternative embodiments could be implemented, using either current technology or technology developed after the filing date of this patent, which would still fall within the scope of the claims defining the invention.

It should also be understood that, unless a term is expressly defined in this patent using the sentence "As used herein, the term '_____' is hereby defined to mean . . . " or a similar sentence, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term be limited, by implication or otherwise, to that single meaning. Finally, unless a claim element is defined by reciting the word "means" and a function without the recital of any structure, it is not intended that the scope of any claim element be interpreted based on the application of 35 U.S.C. §112, sixth paragraph.

Figure 1:
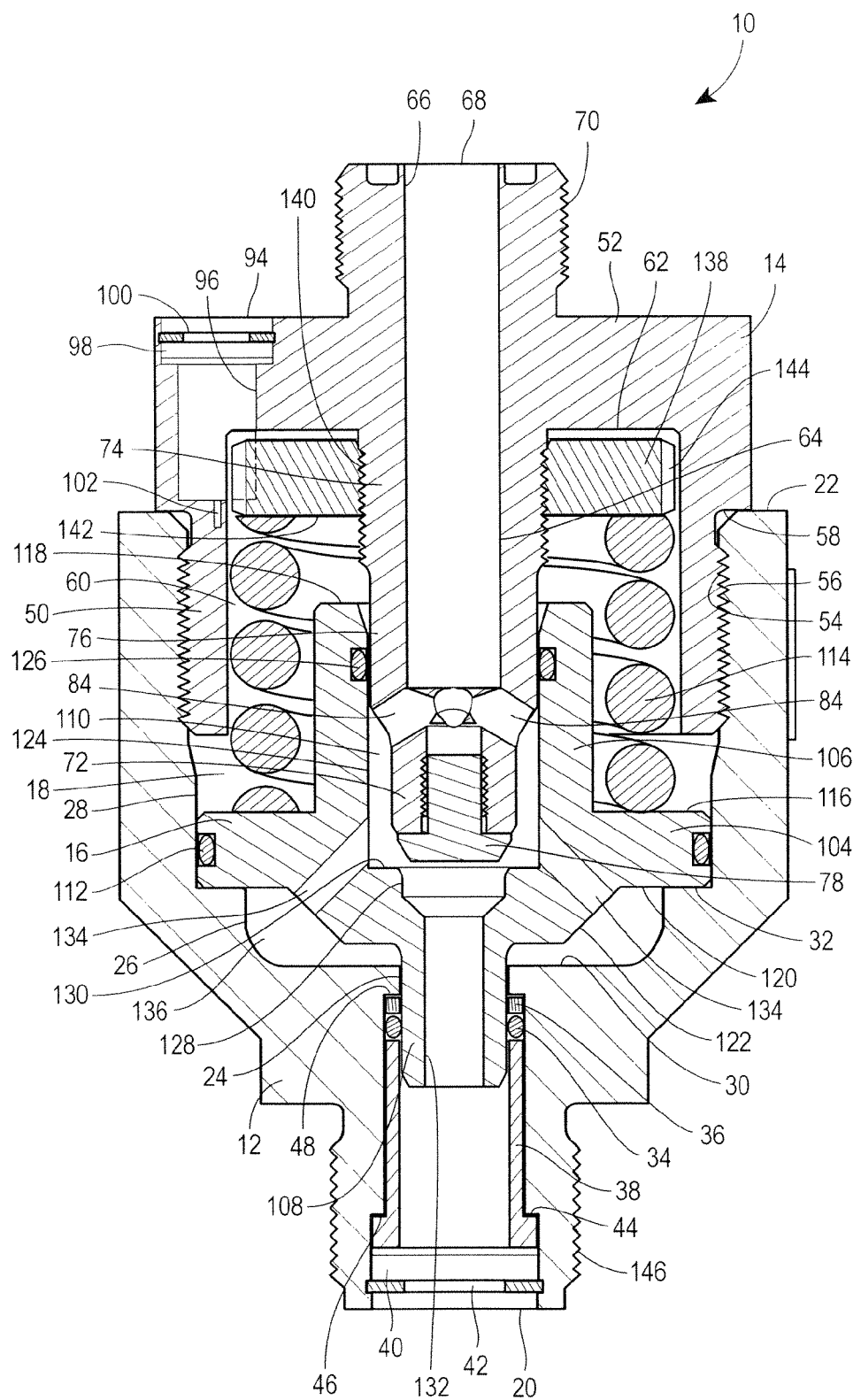
FIG. 1 is a cross-sectional view of a pressure reducing regulator in accordance with the present invention in an open position for allowing fluid flow therethrough.

FIG. 1 illustrates a first embodiment of a flow control device, such as a pressure reducing regulator 10, in accordance with the invention, including a body 12, a bonnet 14 demountably attached thereto, and a piston 16 disposed and slidable within a device cavity defined by inner surfaces of the body 12 and the bonnet 14 when those components are demountably attached to form the housing of the pressure reducing regulator 10. The body 12 includes an inner surface defining an axial bore 18 extending through the body 12 from an inlet port 20 to an annular top edge 22 of the body 12. For purposes of clarity, directional indications such as top, bottom, upper and lower are used to describe spatial relationships of the components of the pressure reducing regulators as illustrated in the drawing figures consistently with the orientation of the regulators. However, those skilled in art will understand that the pressure reducing regulators may be installed in any orientation necessary for a given implementation and that elements described as being upper and lower elements in this description may be left and right, right and left, or lower and upper elements depending on that orientation.

The inner surface defining the axial bore 18 of the body 12 may include a lower or inlet portion 24 proximate the inlet port 20, an intermediate portion 26 having a larger diameter than the inlet portion 24, and an upper portion 28 having a still larger diameter than the intermediate portion 26 and extending upwardly to the top edge 22. The portion of the inner surface between the inlet portion 24 and the intermediate portion 26 defines a bottom wall 30 of the axial bore 18, and the portion of the inner surface between the intermediate portion 26 and upper portion 28 defines a shoulder 32 of the axial bore 18. In one embodiment, the inlet portion 24 of the inner surface may define a portion of the axial bore 18 having a uniform diameter from the inlet port 20 to the bottom wall 30, with the exception of providing a groove proximate the bottom wall 30 for receiving an O-ring 34 forming a seal between the inlet portion 24 and the corresponding component of the piston 16. However, to facilitate manufacturing of the body, the inlet portion 24 as illustrated in FIG. 1 has progressively increasing diameters as the inlet portion 24 of the inner surface proceeds from the bottom wall 30 toward the inlet port 20 to accommodate insertion of the O-ring 34 and a back-up ring 36, as well as a sleeve 38, filter 40 and snap-fit ring 42. The lip portion 24 may define a shoulder 44 configured to engage a corresponding outer shoulder 46 of the sleeve 38 to provide a gap between an upper edge of the sleeve 38, a further shoulder 48 of the inlet portion 24 for receiving the O-ring 34 and back-up ring 36. The filter 40 may be inserted through the inlet port 20 after the sleeve 38 and abut the bottom edge of the sleeve 38, and be retained in place by the snap-fit ring 42 that may be pressed into a corresponding groove in the inlet portion 24 proximate the inlet port 20. For maintenance purposes, the ring 42 may be pulled out of the groove of the inlet portion 24 such that the O-ring 34, back-up ring 36, sleeve 38 and filter 40 may be pulled out of the inlet portion 24.

The bonnet 14 may be configured to demountably attach to the body 12, and include an annular portion 50 extending outwardly from a top part 52 of the bonnet 14. The annular portion 50 of the bonnet 14 may have external threads 54 on the outer surface thereof that mesh with internal threads 56 of the upper portion 28 of the inner surface of the body 12 to allow the bonnet 14 to be screwed into the body 12 with a downward facing shoulder 58 engaging the top edge 22 of the body 12. The annular portion 50 and top part 52 may have an inner surface defining an axial bore 60 and a top wall 62. The bonnet 14 also includes an axially elongated tubular sleeve 64 integrally joined to and extending downwardly from the top part 52, and being axially aligned with the bore 18 of the body 12. The bonnet 14 further includes an inner surface defining an axial bore 66 extending from an outlet port 68 through an externally threaded neck 70, the top part 52 and the elongated tubular sleeve 64 to a seat mount 72 extending from a lower end of the sleeve 64 toward the inlet portion 24 of the inner surface of the body 12 when the bonnet 14 is attached thereto. Configured and attached in this manner, the axial bore 66 is substantially axially aligned with the bore 18 of the body 12.

The tubular sleeve 64 has a top part 74 having an externally threaded outer surface, and a reduced outer diameter intermediate part 76 extending between the seat mount 72 and the top part 74, and with the seat mount 72 receiving a valve seat 78 such that the valve seat 78 is disposed distal to the top wall 62. The lower part 76, seat mount 72 and valve seat 78 are illustrated in greater detail in FIG. 1A. The seat mount 72 at its upper end is of the same outer diameter as the intermediate part 76, with the outer diameter of the seat mount 72 tapering down to hollow cylindrical portion 80 of the seat mount 72, thereby defining a frustoconical portion 82 of the seat mount 72 disposed between the intermediate portion 76 and a hollow cylindrical portion 80. The frustoconical portion 82 includes one or more apertures 84 extending between the bore 66 and the outer surface of the frustoconical portion 82 to place the bore 66 in fluid communication with the exterior of the tubular sleeve 64. The cylindrical portion 80 may have an internally threaded surface 86 defining a bore 88 of the seat mount 72. The valve seat 78 includes a reduced diameter upper cylindrical portion 90 and a lower frustoconical portion 92 having a major base disposed at the interface with the cylindrical portion 90 and having an outer diameter larger than the outer diameter of the cylindrical portion 90. The bore 86 of the seat mount 72 and the cylindrical portion 90 of the valve seat 78 may be dimension so that the cylindrical portion 90 may be pressed or screwed into the bore 86 and engaged by the internal threads to retain the cylindrical portion 90 therein. The valve seat 78 may be fabricated from a hard yet resilient material, such as Vespel® or other similar plastics, or other appropriate materials, that may be pressed or screwed into the bore 88 of the cylindrical portion 80, and that may deform as necessary when the pressure reducing regulator 10 closes to form a substantially airtight seal.

Returning to FIG. 1, the bonnet 14 may further include an offset vent port 94 providing a release for fluids as the regulator 10 opens and closes, and a safety release in the event of a failure of an O-ring seal such that high-pressure fluid leaks into the cavity formed by the axial bores 18, 60 of the body 12 and bonnet 14, respectively. The vent port 94 may further provide access for insertion of an adjustment tool in a manner described more fully below. The vent port 94 may include an inner surface defining an axial bore 96 extending downwardly from the opening of the vent port 94 with a longitudinal axis generally parallel to and offset from the longitudinal axes of the bores 18, 60 and 66 and intersecting the inner surface of the annular portion 50 and top part 52 of the bonnet 14. Configured in this way, the axial bore 96 of the vent port 94 places the cavity formed by the body 12 and bonnet 14 in fluid communication with the ambient atmosphere surrounding the exterior of the regulator 10. The inner surface of the vent port 94 is configured in a similar manner as the inlet portion 24 proximate the inlet port 20 such that a filter 98 may be disposed therein with a snap-fit ring 100 pressed into a corresponding groove in the inner surface to retain the filter 98. At the opposite end from the opening of the vent port 94, the inner surface may further define a bushing 102 for receiving a portion of the adjustment tool in a manner to be discussed more fully below.

The piston 16 is slidably mounted in the cavity formed by the bores 18, 60 of the body 12 and bonnet 14, respectively, for axial movement between the opened and closed positions of the regulator 10. The piston 16 includes a central flange portion 104 dimensioned to form a close sliding fit with the inner surface forming the upper portion 28 of the bore 18, an upwardly extending hollow cylindrical portion 106, and a downwardly extending sleeve 108. An inner surface of the piston 16 defines an axial bore 110 aligned with the longitudinal axes of the bores 18, 60 and 66. The flange portion 104 of the piston 16 has an annular groove with an O-ring 112 disposed therein to form a fluid seal with the inner surface of the body 12 during the entire axial movement of the piston 16 relative to the body 12 and bonnet 14. The cylindrical portion 106 has an outer diameter smaller than the inner diameter of the annular portion 50 of the bonnet 14 such that a first coil spring 114 may be disposed between the outer surface of the cylindrical portion 106 and the inner surface of the annular portion 50 and engage a top surface 116 of the flange portion 104. In an alternate embodiment, the spring 114 may be disposed above and engage a top edge 118 of the cylindrical portion 106.

The sleeve 108 extends downwardly from a bottom surface 120 of the flange portion 104, and may include an intermediate frustoconical portion 122 tapering downwardly from a major base at the bottom surface 120 of the flange portion 104 to a minor base proximate the sleeve 108. The sleeve 108 may have an outer diameter dimensioned to form a close sliding fit with the inlet portion 24 of the bore 18 of the body 12. The outer surface of the sleeve 108 may be engaged by the O-ring 34 disposed within the inlet portion 24 to form a fluid seal between the inlet portion 24 and the sleeve 108 during the entire axial movement of the piston 16 relative to the body 12 and the bonnet 14.

Figure 1A:
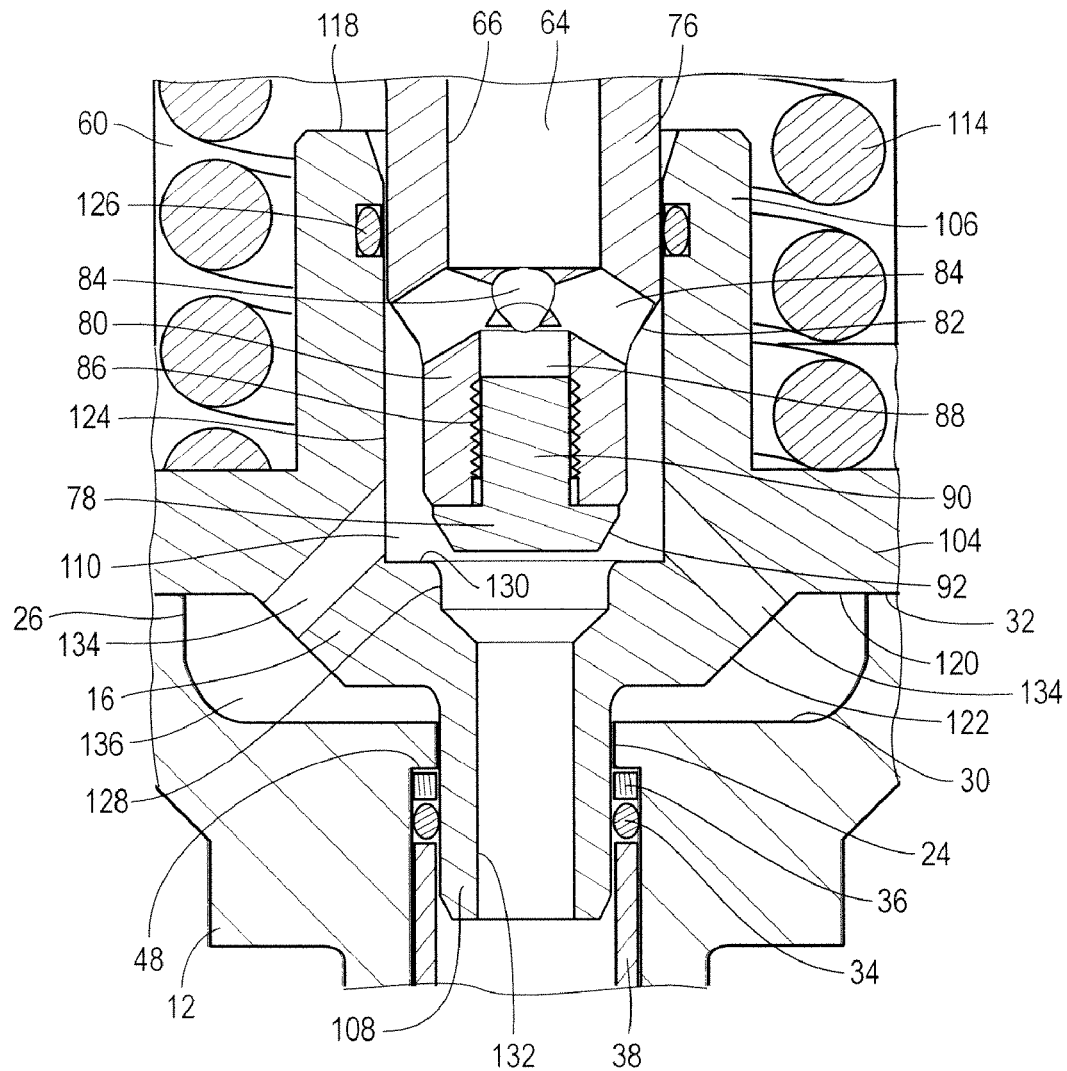
FIG. 1A is an enlarged cross-sectional view of a portion of the pressure reducing regulator of FIG. 1.

The bore 110 includes an upper portion 124 extending downwardly from the top edge 118 of the cylindrical portion 116, and having the lower part 76 and seat mount 72 of the sleeve 64 extending thereinto. The upper portion 124 includes an internal groove with an O-ring 126 therein to provide a fluid seal with the lower part 76 of the sleeve 64 as the piston 16 moves axially relative to the sleeve 64. The bore 110 further includes an intermediate portion 128 having a smaller diameter than the upper portion 124 to provide an annular upwardly facing shoulder 130, and with the diameter of the intermediate portion 128 being smaller than the maximum diameter of the major base of the frustoconical portion 92, but greater than the minimum diameter of the minor base of the frustoconical portion 92 (FIG. 1A). As the bore 110 continues downwardly toward the sleeve 108, the diameter may further be reduced at a lower portion 132 passing through the sleeve 108. The piston 16 further includes one or more apertures 134 extending between the bore 110 and the surface of the piston 16 below the flange portion 104 to place the bore 110 in fluid communication with a cavity 136, which is a portion of the device cavity defined by the bottom surface 120 of the piston 16 and the inner surface defining the bore 18 of the body 12 between the O-rings 34 and 112.

In order to adjust the outlet pressure required to close the regulator 10, an adjustment gear 138 is provided having an internally threaded bore 140 dimensioned to mesh with the external threads of the top part 74 of the sleeve 64. To facilitate installation of the adjustment gear 138 on the sleeve 64, the lower part 76 of the sleeve 64 and, correspondingly, the inner diameter of the upper portion 124 of the bore 110 are dimensioned to allow the adjustment gear 138 to slide over the lower part 76 of the sleeve 64 and onto the threads of the top part 74. When the bonnet 14 is screwed onto the body 12, the coil spring 114 is disposed between the top surface 116 of the piston 16 and a bottom surface 142 of the adjustment gear 138 such that the tension in the coil spring 114 may be increased by rotating the adjustment gear 138 in a direction to cause the adjustment gear 138 to move axially along the top part 74 of the sleeve 64 toward the piston 16, and may be decreased by rotating the adjustment gear 130 in the opposite direction to cause the adjustment gear 138 move axially along the top part 74 of the sleeve 64 away from the piston 16. In some implementations, it may be desired to dimension the components such that the adjustment gear 138 may disengage the coil spring 114 as the adjustment gear 138 moves outwardly towards the top wall 162. Moreover, a bearing, such as a needle bearing, may be disposed between the adjustment gear 138 and the coil spring 114 to allow the adjustment gear 130 to rotate without causing rotation of the coil spring 114 and the piston 16. The adjustment gear 138 further includes teeth 144 spaced about the outer circumference of the adjustment gear 138 that are engaged to adjust the position of the gear 138 in a manner described more fully below.

The coil spring 114 constantly resiliently urges the piston 16 toward the bottom wall 30 of the bore 18. When the outlet pressure within the cavity 136 of the regulator 10 is insufficient to overcome the force applied to the piston 16 by the coil spring 114, such as when no pressure source is connected to the externally threaded neck 146 of the body 12 and no outlet conduit is attached to the externally threaded neck 70 as shown in FIG. 1, the coil spring 114 forces the bottom surface 120 of the piston 16 into engagement with the shoulder 32 of the bore 18 such that fluid may flow from the inlet port 20 through the inlet portion 24 of the bore 18 to the bore 110, through the apertures 84 to the bore 66, and through the outlet port 68. At this time, the cavity 136 is also in fluid communication with both the inlet port 20 and the outlet port 68 via the apertures 134 and, consequently, also receives pressurized fluid from the inlet port 20.

When the pressure reduction regulator 10 is installed in the field, a high-pressure source is connected at the inlet port 20 and an output line is connected at the outlet port 68. When a pressurized fluid is provided by the source connected to the inlet port 20, the pressurized fluid flows from the inlet port 20 through the inlet portion 24, the bore 110, the apertures 84, and the bore 66, and out the outlet port 68 to the output line. At the same time, pressurized fluid flows from the bore 110 through the apertures 134 to the cavity 136. As the pressure at the outlet port 68 and, consequently, the pressure in the cavity 136 increases, the force of the pressurized fluid acts on the bottom surface 120 of the piston 16 against the biasing force of the coil spring 114. Once the pressure in the cavity 136 reaches a threshold level, the force acting on the bottom surface 120 of the piston 16 overcomes the force of the coil spring 114 and begins to move the piston 16 off of the shoulder 32 and toward the valve seat 78.

Figure 2:
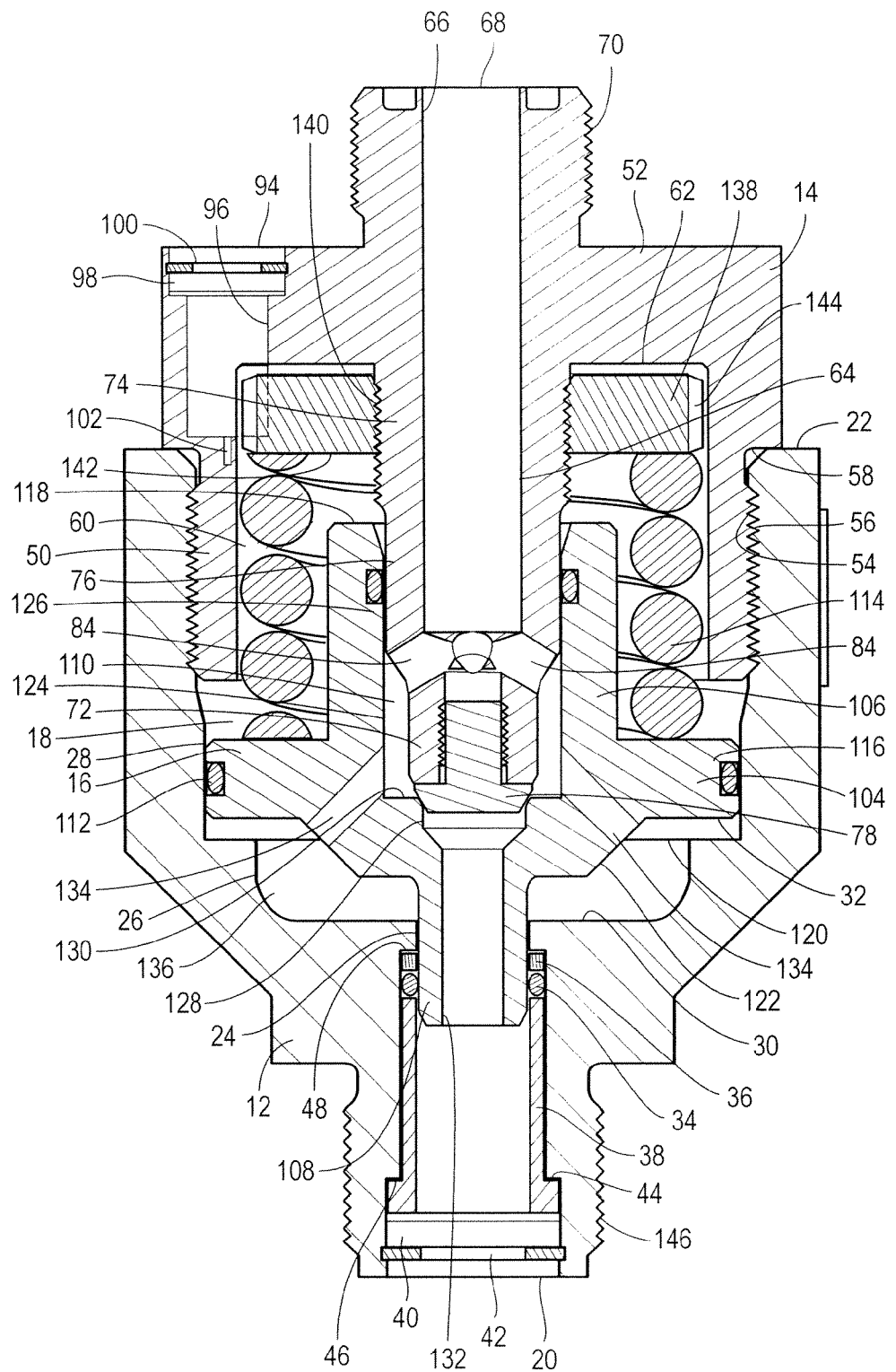
FIG. 2 is a cross-sectional view of the pressure reducing regulator of FIG. 1 in a closed position for blocking fluid flow therethrough.

As the pressure in the cavity 136 continues to increase, the inner surface of the piston 16 is eventually engaged by the valve seat 78 to close the regulator 10 as shown in FIG. 2 when the pressure at the outlet port 68 reaches the predetermined or preset maximum outlet pressure to which the regulator 10 has been adjusted. When the piston 16 is in the closed position, an axial intermediate part of the frustoconical portion 92 of the valve seat 78 abuts against the inner surface of the piston 16 at the juncture of the upper portion 124 and intermediate portion 128 to block the fluid flow from the inlet portion 24 of the bore 18 to the upper portion 124 of the bore 110 and to the bore 66. As long as the pressure at the outlet port 68 is maintained at or above the maximum outlet pressure, the pressure within the cavity 136 will maintain the seating of the piston 16 against the valve seat 78. During this time, in the event that the seal formed by either of the O-rings 112 or 126 fails, pressurized fluid leaking past the failed O-ring 112 or 126 and into the portion of the cavity formed by the body 12 and bonnet 14 above the flange portion 104 of the piston 16 will be vented through the bore 96 to the vent port 94, and into the ambient atmosphere surrounding the regulator 10 or into an appropriate container attached at the vent port 94. When the pressure at the outlet port 68 is reduced below the maximum outlet pressure for the regulator 10, the biasing force of the coil spring 114 overcomes the pressure within the cavity 136 to force the piston 16 downwardly towards the shoulder 32 to unseat the piston 16 from the valve seat 78 and again place the inlet port 20 in fluid communication with the outlet port 68. If the inlet pressure at the inlet port 20 is greater than the maximum outlet pressure, the outlet pressure and, correspondingly, the pressure in the cavity 136 may increase and again cause the piston 16 to move into engagement with the valve seat 78.

Figure 3A:
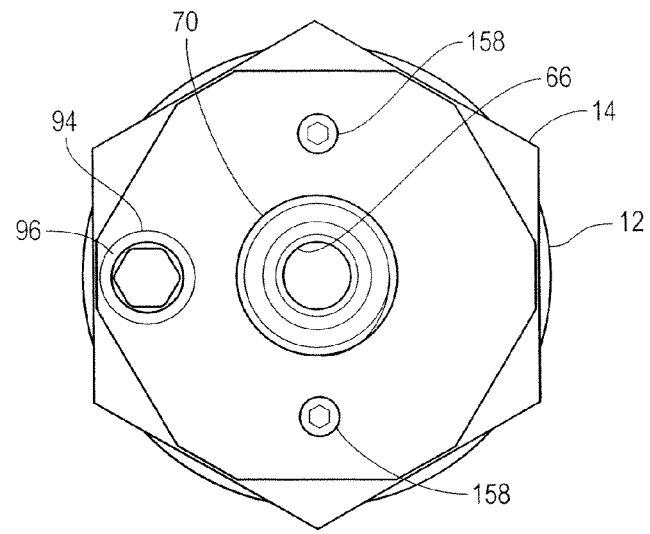
FIG. 3A is a top view of the pressure reducing regulator of FIG. 1 having an adjustment tool inserted therein.
Figure 3B:
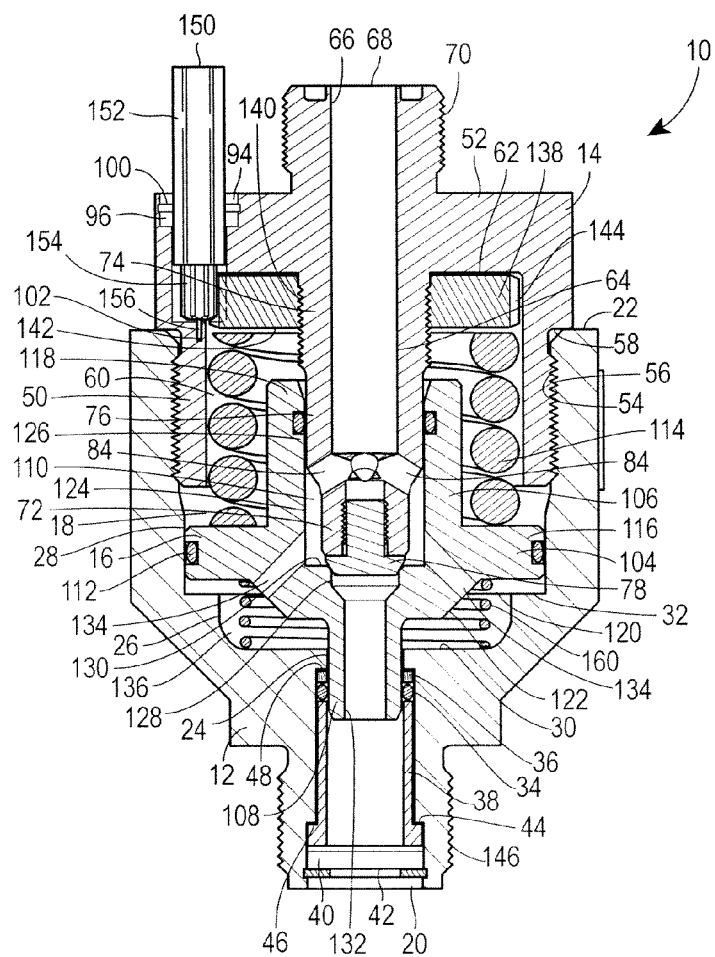
FIG. 3B is a cross-sectional view of the pressure reducing regulator of FIG. 1 in a closed position for blocking fluid flow therethrough, and further illustrating the adjustment tool and a spring for closing the pressure reducing regulator in low-pressure conditions.

FIGS. 3A and 3B illustrate the pressure reducing regulator 10 having an adjustment tool 150 inserted therein to adjust the position of the adjustment gear 138. The filter 98 and snap-fit ring 100 are removed from the bore 96 to allow insertion of the adjustment tool 150 through the vent port 94. The adjustment tool 150 may include a handle 152 configured to be engaged by the hand of the user or by a further tool to rotate the adjustment tool 150 within the bore 96, and the handle 152 maybe dimensioned so that the maximum outer diameter of the handle 152 is slightly less than the inner diameter of the corresponding portion of the bore 94 in which the handle 152 is disposed so that substantial lateral movement of the adjustment tool 150 is prevented. The adjustment tool 150 may further include a downwardly extending gear 154 axially aligned with the handle 152 and having teeth configured to mesh with the teeth 144 of the gear 138 extending through the opening between the bores 60, 96 when the adjustment tool 150 is disposed within the bore 96. To further facilitate alignment of the adjustment tool 150 within the bore 96, the adjustment tool 150 may further include a shaft 156 axially aligned with the handle 152 and the gear 154, and extending downwardly from the gear 154 and received by the bushing 102 when the adjustment tool 150 is inserted into the bore 96.

Once the tool 150 is inserted into the bore 96 with the teeth of the gear 154 meshing with the teeth 144 of the gear 138, adjustment of the outlet pressure required to close the regulator 10 is affected by rotation of the tool 152 to cause a corresponding rotation of the gear 138 about the top part 74 of the sleeve 64 to move the gear 130 axially along the sleeve 64 toward or away from the piston 16 depending on the direction of rotation of the adjustment tools 150. As the tool 150 is rotated in a direction to cause the gear 138 to move toward the piston 16, the gear 138 engages and compresses the coil spring 114 to increase the outlet pressure necessary to move the piston 16 toward the valve seat 78 to close the regulator 10. Conversely, rotation of the tool 150 in the opposite direction moves the gear 138 away from the piston 16 such that the coil spring 114 decompresses and correspondingly reduces the outlet pressure necessary to move the piston 16 toward the valve seat 78. As shown in FIG. 3B, the components may be configured such that the gear 138 may completely disengage from the coil spring 114 when the gear 138 is disposed in an uppermost position proximate the top wall 62 of the bonnet 14.

To ensure that the gear 138 remains in the desired position, the regulator 10 may further include one or more set screws 158 (FIG. 3A) that may be received in internally threaded apertures through the top part 52 of the bonnet 14 between the outer surface of the bonnet 14 and the top wall 62. The set screws 158 may be screwed into the apertures and engage a top surface of the gear 138 to provide friction between the set screws 158 and the top surface of the gear 138, and between the threads of the gear 138 and the top part 74 only sleeve 64, to prevent rotational movement of the gear 138. To adjust the gear 138, the set screws 158 are unscrewed to disengage from the top surface of the gear 138 and allow the gear 130 to rotate in response to the rotation of the tool 150. Once the gear 138 is repositioned, the set screws 158 are again screwed down into engagement with the top surface of the gear 138.

While the adjustment mechanism illustrated and described herein incorporates a pair of side-by-side spur gears 138, 154 having parallel rotational axes, those skilled in the art will understand that other configurations of gears and orientations of the gears are possible in an adjustment mechanism in accordance with the invention. For example, the size of the coupling for the outlet line attached to the neck 70 of the bonnet 14 in a particular implementation may prevent the adjustment tool 150 from being inserted into the bore 96 as shown in FIG. 3B such that access to the gear 138 may only be obtained with the bore 96 of the vent port 94 oriented perpendicular to the longitudinal axis of the regulator 10 or at another angle such that the bore 96 is directed outwardly toward the side of the regulator 10. In such a case, the gears 138, 154 may be configured as bevel gears or as a mating circular rack and pinion gear, and the bore 96 may be configured to facilitate axial and/or lateral movement of the tool 150 necessary to maintain engagement of the teeth of the gears 138, 154 as the gear 138 moves axially within the regulator 10. Other configurations of the gear 138, the adjustment tool 150, the bore 96 of the vent port 94, and other components of the regulator 10 to implement the adjustment mechanisms described and claimed herein will be apparent to those skilled in the art. Moreover, a wheel may be implemented as the component rotatably disposed on the threaded top part 74, and the adjustment tool and bore 96 may be configured to engage a surface of the wheel to rotate the wheel in either direction. The preceding examples and other configurations are contemplated by the inventors as having use in pressure reducing regulators in accordance with the present invention.

FIG. 3B further illustrates an embodiment of a pressure reducing regulator 10 that may be implemented where it is desired to adjust the regulator 10 down to a 0 PSI outlet pressure no flow condition thereby enabling a user to close the regulator 10 while the regulator 10 is connected in line to a pressurized fluid source at inlet port 20 and to an outlet line at outlet port 68. In this embodiment, a second coil spring 160 may be disposed between the bottom surface 120 of the piston 16 and the bottom wall 30 of the bore 18 to apply force to the bottom surface 120 of the piston 16 in the direction of the valve seat 78, and in opposition to the force applied by the coil spring 114. The coil springs 114, 160 may be selected so that the gear 38 may be adjusted to a position wherein the force applied by the coil spring 160 may overcome the force applied by the coil spring 114, the combined weights of the piston 16 and coil spring 114 (depending on the orientation of the regulator 10), and the friction at the seals formed by the O-rings 34, 112, 126, and force the piston 16 into engagement with the valve seat 78. As the gear 138 is adjusted further towards the top wall 162 of the bonnet 52, the ceiling force between the piston 16 and a valve seat 78 may be increased as the coil spring 114 is decompressed. In order to reopen the regulator 10, the gear 138 is adjusted in the direction of the piston 16 to compress the coil spring 114 and increase the force applied by the coil spring 114 until the force applied by the coil spring 160 is overcome and the piston 16 unseats from the valve seat 78. The configurations of the coil springs 114, 160 are exemplary only, and those skilled in the art will understand that other types of springs or other resilient members may be implemented in the regulator 10 to bias the piston 16 into and out of engagement with the valve seat 78 as discussed herein. Moreover, the springs or other resilient members may be positioned in alternate locations within the regulator 10 to act on the piston 16 in the manner discussed, and such variations of the springs and other resilient members and their location within the regulator 10 are contemplated by the inventors is having use in pressure reducing regulators 10 in accordance with the present invention.

Figure 4:
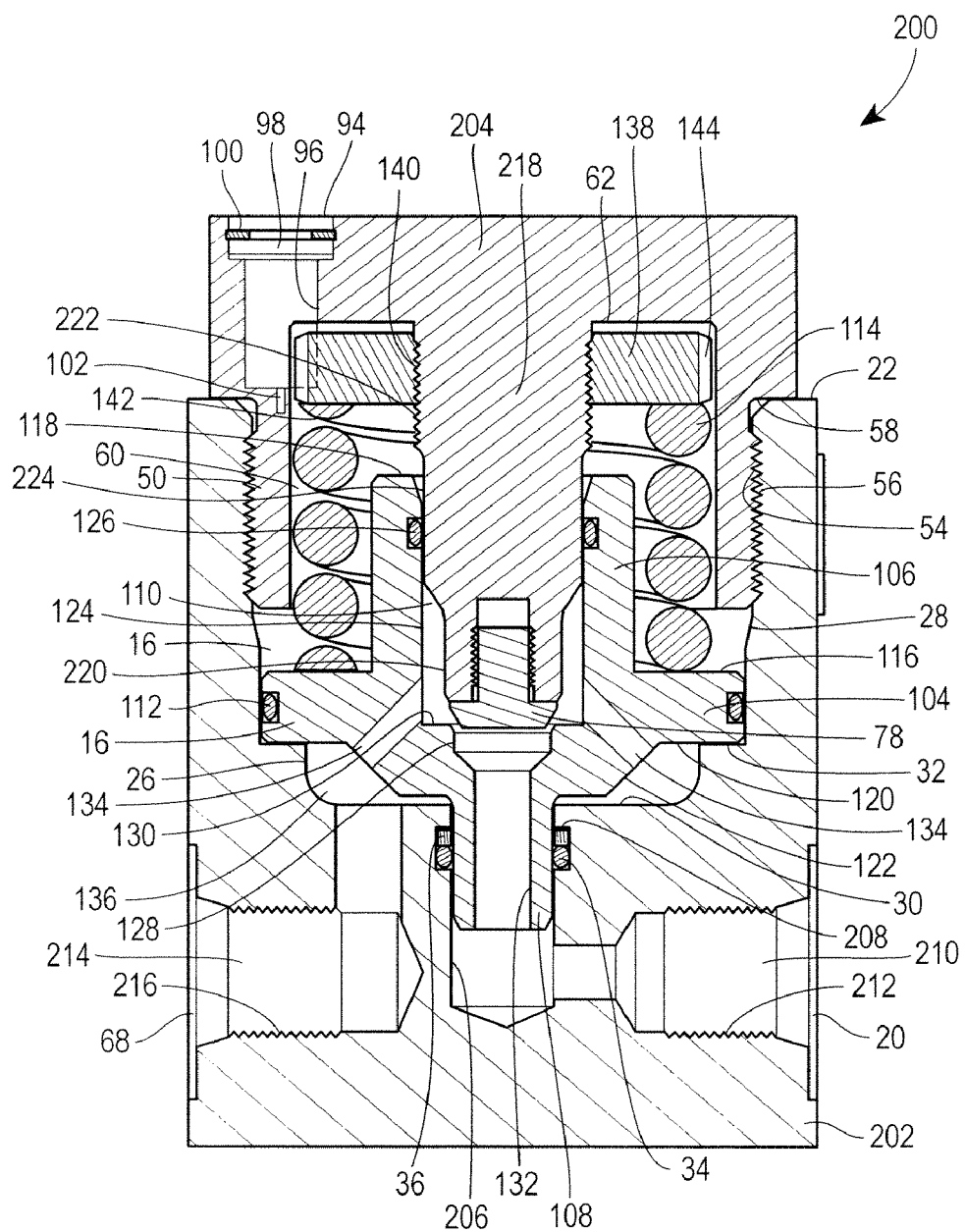
FIG. 4 is a cross-sectional view of an alternative embodiment of a pressure reducing regulator in accordance with the present invention in an open position for allowing fluid flow therethrough.
Figure 5:
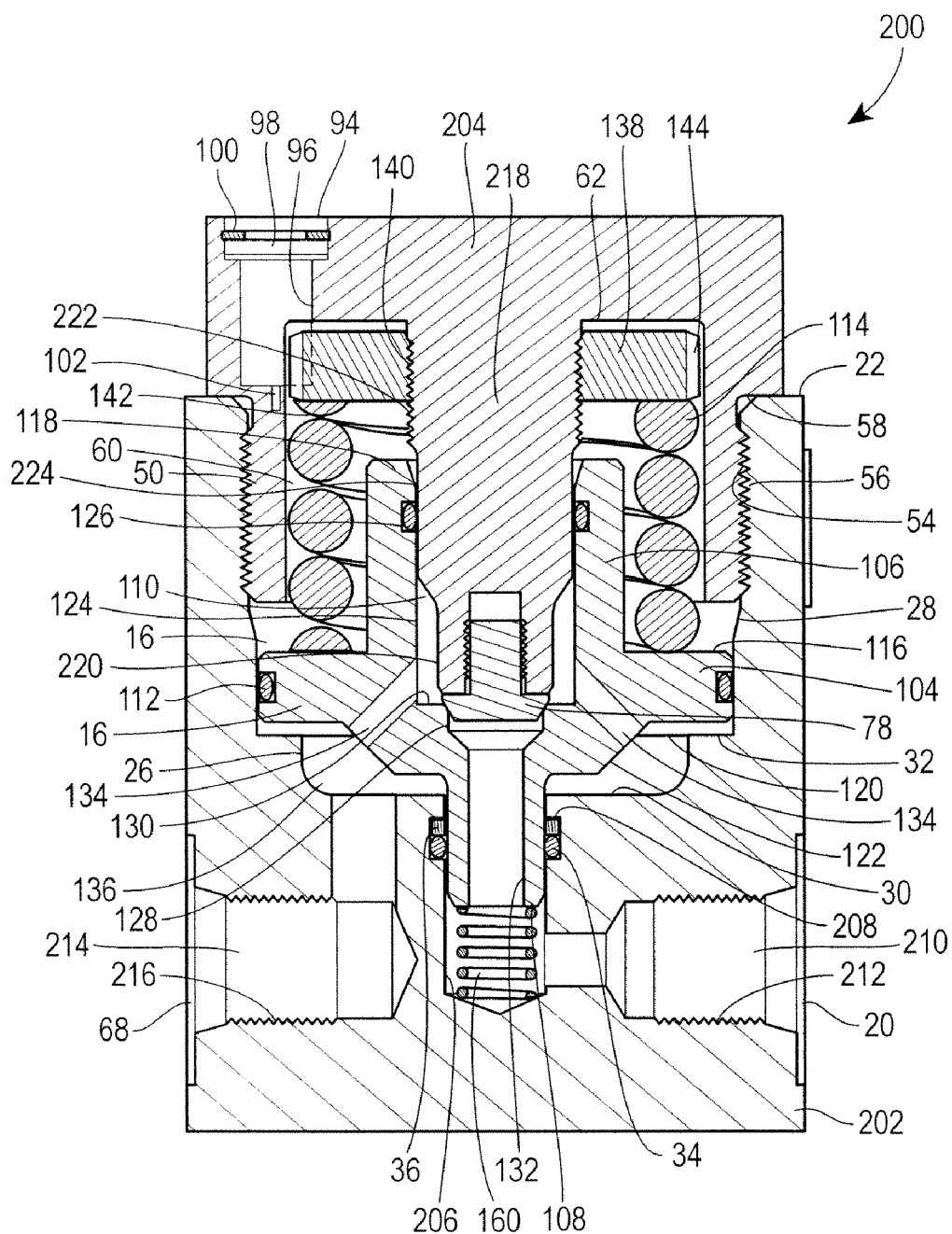
FIG. 5 is a cross-sectional view of the pressure reducing regulator of FIG. 1 in a closed position for blocking fluid flow therethrough, and further illustrating a spring for closing the pressure reducing regulator in low-pressure conditions.

FIGS. 4 and 5 illustrate an alternative embodiment of a pressure reducing regulator 200 having the inlet port 20 and outlet port 68 disposed side-by-side on the body 202, and with no fluid flow through the bonnet 204. For consistency of reference and to assist in identifying differences between the regulators 10 and 200, the same reference numerals are used to identify corresponding elements in both embodiments. For example, the piston 16 in regulator 200 may be the same piston 16 implemented within the regulator 10 and, therefore, the same reference numerals are applied to the piston 16 in both embodiments. Referring to FIG. 4, an inlet portion 206 of the bore 18 of the body 202 may extend downwardly from the intermediate portion 26 into the body 202 and be configured to receive the sleeve 108 of the piston 16 in a similar manner as the inlet portion 24 described above. The inlet portion 206 may further define a groove 208 for receiving the O-ring 34 and back-up ring 36. The inlet port 20 may be connected to and placed in fluid communication with the inlet portion 26 of the bore 18 by an inlet bore 210 having an internally threaded portion 212 for receiving a coupling from a pressurized fluid supply. Similarly, the outlet port 68 may be connected to and placed in fluid communication with the cavity 136 by an outlet bore 214 having an internally threaded portion 216 for receiving a coupling of an outlet line.

The bonnet 204 of the regulator 200 is generally similar to the bonnet 14 of the regulator 10, but with the sleeve 64 being replaced by a solid shank 218 extending downwardly from the top wall 62 of the bonnet 204 and being axially aligned with the bore 18 of the body 202. In opposition to the sleeve 64, the shank 218 does not include a bore 66 and apertures 84 allowing fluid flow through the bonnet 204. However, the shank 218 includes a seat mount 220, a top part 222 and a lower part 224 having similar outer surfaces as the corresponding seat mount 72, top part 74 and lower part 76, respectively, of the sleeve 64. Consequently, the inner threads 140 of the gear 138 mesh with the external threads of the top part 222, the lower part 224 is slidably received within the upper portion 124 of the bore 110, and the seat mount 220 receives and retentively engages the valve seat 78.

As with the regulator 10, the coil spring 114 biases the piston 16 to the normal open position shown in FIG. 4 when pressurized fluid is not applied to the regulator 200. Pressurized fluid supplied at the inlet port 20 flows through the inlet port 20 to the inlet portion 206 of the bore 18, and into the lower portion 132 of the bore 110. Because the shank 204 does not include the bore 66 and apertures 84 of the sleeve 64, the pressurized fluid is diverted through the apertures 134 to the cavity 136, and through the outlet bore 214 to the outlet port 68. As the pressure at the outlet port 68 and, consequently, the pressure in the cavity 136 increases, the force of the pressurized fluid acts on the bottom surface 120 of the piston 16 against the biasing force of the coil spring 114 and in the direction of the valve seat 78. Once the pressure in the cavity 136 reaches a threshold level, the force acting on the bottom surface 120 of the piston 16 overcomes the force of the coil spring 114 and begins to move the piston 16 toward the valve seat 78.

As the pressure in the cavity 136 continues to increase, the inner surface of the piston 16 is eventually engaged by the valve seat 78 to close the regulator 10 as shown in FIG. 5 when the pressure at the outlet port 68 reaches the preset maximum outlet pressure to which the regulator 10 has been adjusted. When the piston 16 is in the closed position, the frustoconical portion 92 of the valve seat 78 abuts against the inner surface of the piston 16 in the manner discussed above to block the fluid flow from the inlet port 20 to the cavity 136 and outlet port 68. As long as the pressure at the outlet port 68 is maintained at or above the maximum outlet pressure, the pressure within the cavity 136 will maintain the seating of the piston 16 against the valve seat 78. When the pressure at the outlet port 68 is reduced below the maximum outlet pressure for the regulator 10, the biasing force of the coil spring 114 overcomes the pressure within the cavity 136 to force the piston 16 downwardly to unseat the piston 16 from the valve seat 78 and again place the inlet port 20 in fluid communication with the outlet port 68. If the inlet pressure at the inlet port 20 is greater than the maximum outlet pressure, the outlet pressure and, correspondingly, the pressure in the cavity 136 may increase and again cause the piston 16 to move into engagement with the valve seat 78.

FIG. 5 further illustrates an alternative placement of the coil spring 160 within the inlet portion 206 of the bore 18 between a bottom surface of the sleeve 108 and a bottom wall of the inlet portion 206. As discussed above, the coil spring 160 biases the piston 16 in the opposite direction as the force applied by the coil spring 114 so that the regulator 200 may be placed in the 0 PSI outlet pressure no flow condition with the regulator 200 maintained in the closed position until the adjustment gear 138 compresses the coil spring 114 to overcome the force applied by the coil spring 160. It will be apparent to those skilled in the art that the coil spring 160 may be placed in other locations within the regulator 200 to bias the piston 16 toward the closed position. For example, the coil spring 160 may have an inner diameter slightly larger than the outer diameter of the sleeve 108, and be disposed about the sleeve 108. Moreover, the coil spring 160 may have an outer diameter slightly smaller than the inner diameter of the intermediate portion 26 of the bore 18 and engage the flange portion 104 of the piston 16. Other configurations of the springs 114, 160 will be apparent and are contemplated by the inventors as having use with pressure reducing regulators in accordance with the invention.

While the preceding text sets forth a detailed description of numerous different embodiments of the invention, it should be understood that the legal scope of the invention is defined by the words of the claims set forth at the end of this patent. The detailed description is to be construed as exemplary only and does not describe every possible embodiment of the invention since describing every possible embodiment would be impractical, if not impossible. Numerous alternative embodiments could be implemented, using either current technology or technology developed after the filing date of this patent, which would still fall within the scope of the claims defining the invention.

What is claimed is:

1. A flow control device for controlling a fluid flow between an inlet port and an outlet port, comprising:
   a body having an upper annular portion and an axial bore in fluid communication with the inlet port;
   a bonnet removably mounted to the body and having a top portion, an axial bore and an axially elongated sleeve extending downwardly from the top portion and having a valve seat, wherein the bonnet axial bore and the body upper annular portion form a cavity within the flow control device with at least a portion of the cavity being in fluid communication with the outlet port;
   a piston axially disposed within the body axial bore and in a fluid sealing relationship with a wall defining the body axial bore, the piston having an axial bore having an upper portion receiving the sleeve, and apertures placing the piston axial bore in fluid communication with a bottom surface of the piston, the piston being axially movable along the sleeve between a closed position with a shoulder of the piston axial bore engaging the valve seat and an open position with the shoulder disengaged from the valve seat, wherein the outlet port is in fluid communication with the piston bottom surface in both piston positions;
   a wheel operatively coupled to the top part of the sleeve such that the wheel moves axially along the sleeve when the wheel is rotated; and
   a spring disposed between the piston and the wheel and biasing the piston toward the open position,
   wherein the pressure on the bottom of the piston causes the piston to move to the closed position when the outlet port pressure is at least a predetermined maximum outlet pressure, and wherein the predetermined maximum outlet pressure is increased by rotating the wheel in one direction and is decreased by rotating the wheel in the opposite direction, and
   wherein the bonnet further includes a vent port having a bore extending inwardly from the vent port and intersecting the inner surface of the bonnet proximate the wheel such that the wheel is accessible from the exterior of the flow control device when the bonnet is attached to the body, and engageable to rotate the wheel in either direction, and
   wherein the wheel comprises a plurality of teeth spaced about an outer circumference of the wheel, and wherein the vent port bore is configured to receive an adjustment tool having a gear with teeth configured to mesh with the teeth of the wheel such that rotation of the adjustment tool causes a corresponding rotation of the wheel, the vent port bore also including an alignment structure that engages a corresponding alignment structure of the adjustment tool when the adjustment tool is inserted into the vent port bore to prevent lateral movement of the adjustment tool within the vent port bore.

2. A flow control device in accordance with claim 1, wherein a piston lower portion and a body lower portion engage in both piston positions with the body axial bore in fluid communication with the piston axial bore.

3. A flow control device in accordance with claim 2, wherein the piston lower portion comprises a piston sleeve extending from the bottom surface of the piston and being disposed within and in a fluid sealing relationship with the body axial bore.

4. A flow control device in accordance with claim 1, wherein the valve seat is physically separable from the sleeve, and wherein the end of the sleeve distal to the bonnet top portion includes a seat mount configured to retentively engage the valve seat.

5. A flow control device in accordance with claim 1, wherein the alignment structure of the vent port bore includes a bushing and the alignment structure of the adjustment tool includes an outwardly extending shaft, the bushing being configured to receive the outwardly extending shaft of the adjustment tool when the adjustment tool is inserted into the vent port bore.

6. A flow control device in accordance with claim 1, wherein longitudinal axes of the body axial bore, the sleeve and the piston axial bore are coincident, and a longitudinal axis of the vent port bore is parallel to and offset from the coincident longitudinal axes of the body axial bore, the sleeve and the piston axial bore.

7. A flow control device in accordance with claim 1, further comprising a further spring engaging the bottom surface of the piston and biasing the piston toward the closed position, and wherein the springs are configured so that the wheel may be rotated to a first position whereby the force applied by the first spring overcomes the force applied by the further spring to retain the piston in the open position, and the wheel may be rotated to a second position whereby the force applied by the further spring overcomes the force applied by the first spring to retain the piston in the closed position.

8. A flow control device in accordance with claim 1, wherein the bonnet includes a threaded aperture extending between the outer surface of the bonnet and the inner surface proximate the wheel, the flow control device comprising a set screw disposed in the threaded aperture of the bonnet and configured to engage the wheel to prevent rotation of the wheel about the tubular sleeve.

9. A flow control device in accordance with claim 1, wherein the bonnet comprises an axial sleeve bore extending from the outlet port through the sleeve to the valve seat, and apertures placing the axial sleeve bore in fluid communication with the exterior of the sleeve.

10. A flow control device in accordance with claim 9, wherein the outlet port is in fluid communication with the piston bottom surface in both piston positions via the piston apertures.

11. A flow control device in accordance with claim 1, wherein the body comprises an inlet bore placing the inlet port in fluid communication with the body axial bore, and an outlet bore placing the outlet port in fluid communication with the body axial bore, and wherein the piston axial bore and apertures place the inlet port in fluid communication with the outlet port.

12. In a flow control device for controlling a fluid flow between and inlet port and an outlet port comprising a body having an inlet bore in fluid communication with the inlet port, a bonnet removably mounted to the body with the outlet port being in fluid communication with the inlet port, a piston axially disposed within the body and the bonnet and in a fluid sealing relationship with a wall defining a cavity within the body and bonnet, the piston having a bottom surface, an axial bore placing the inlet port in fluid communication with the outlet port, and apertures placing the piston axial bore in fluid communication with the bottom surface of the piston, the piston being axially movable between a closed position with the piston axial bore engaging a valve seat of the bonnet to prevent fluid flow from the inlet port to the outlet port and an open position with the piston axial bore disengaged from the valve seat to allow fluid flow, wherein the outlet port is in fluid communication with the piston bottom surface in both piston positions, wherein the flow control device further comprises a spring biasing the piston toward the open position, wherein the pressure on the bottom surface of the piston increases as the outlet port pressure increases in response to the application of pressurized liquid at the inlet port and causes the piston to move to the closed position when the outlet port pressure is at least a predetermined maximum outlet pressure, the improvement comprising:
a wheel rotatably disposed within the cavity of the body and the bonnet and engaging the spring to adjust the force exerted by the spring on the piston to correspondingly adjust the predetermined maximum outlet pressure for closing the flow control device; and
a vent port through the outer surface of the flow control device and having a bore extending inwardly from the vent port and intersecting the inner surface of the bonnet proximate the wheel such that the wheel is accessible from the exterior of the flow control device and engageable to actuate the wheel, wherein a longitudinal axis of the vent port bore is offset from a longitudinal axis of the piston, and
wherein the wheel comprises a plurality of teeth spaced about an outer circumference of the wheel, and wherein the vent port bore is configured to receive an adjustment tool having a gear with teeth configured to mesh with the teeth of the wheel such that rotation of the adjustment tool causes a corresponding rotation of the wheel, the vent port bore also including an alignment structure that engages a corresponding alignment structure of the adjustment tool when the adjustment tool is inserted into the vent port bore to prevent lateral movement of the adjustment tool within the vent port bore.

13. A flow control device in accordance with claim 12, wherein the wheel is disposed on a sleeve within the flow control device such that the wheel moves axially along the sleeve when the wheel is rotated, wherein a longitudinal axis of the sleeve is coincident with the longitudinal axis of the piston, and wherein the predetermined maximum outlet pressure is increased by rotating the wheel in one direction and is decreased by rotating the wheel in the opposite direction.

14. A flow control device in accordance with claim 13, wherein the wheel is accessible from the exterior of the flow control device through the vent port bore and engageable to rotate the wheel in either direction.

15. A flow control device in accordance with claim 12, wherein the alignment structure of the vent port bore includes a bushing and the alignment structure of the adjustment tool includes an outwardly extending shaft, the bushing being configured to receive the outwardly extending shaft of the adjustment tool when the adjustment tool is inserted into the vent port bore.

16. A flow control device in accordance with claim 12, wherein longitudinal axes of the inlet port, the outlet port and the piston axial bore are coincident, and a longitudinal axis of the vent port bore is parallel to and offset from the coincident longitudinal axes of the inlet port, the outlet port and the piston axial bore.

17. A flow control device in accordance with claim 12, wherein longitudinal axes of the inlet port and the outlet port are coincident, the piston axial bore is perpendicular to the longitudinal axes of the inlet port and the outlet port, and a longitudinal axis of the vent port bore is parallel to and offset from the longitudinal axis of the piston axial bore and is perpendicular to the coincident longitudinal axes of the inlet port and the outlet port.

18. A flow control device in accordance with claim 12, further comprising a further spring engaging the bottom surface of the piston and biasing the piston toward the closed position, and wherein the springs are configured so that the wheel may be adjusted to a first position whereby the force applied by the first spring overcomes the force applied by the further spring to retain the piston in the open position, and the wheel may be rotated to a second position whereby the force applied by the further spring overcomes the force applied by the first spring to retain the piston in the closed position.

19. A flow control device in accordance with claim 12, wherein the outlet port is in fluid communication with the piston bottom surface in both positions via the piston apertures.

20. A regulator for controlling a fluid flow between an inlet port and an outlet port, comprising:
a body having an inner bore operatively connected to the inlet port;
a bonnet removably mounted to the body, the bonnet having a sleeve disposed within an axial bore of the bonnet wherein the axial bore of the bonnet and the inner bore of the body form a cavity such that at least a portion of the cavity is in fluid communication with the outlet port;

a piston being adapted to sealingly engage the inner bore of the body and slidably coupled to a lower part of the sleeve to control fluid flow between the inlet port and the outlet port;

a wheel operatively connected to a top part of the sleeve such that the wheel moves axially along the sleeve when the wheel is rotated; and a spring coupled between the piston and the wheel wherein the spring provides a bias force against the piston in response to a fluid force exerted upon a bottom surface of the piston such that a fluid pressure is controlled between the inlet port and the outlet port, and wherein the bonnet further includes a vent port having a bore extending inwardly from the vent port and intersecting the inner surface of the bonnet proximate the wheel such that the wheel is accessible from the exterior of the regulator when the bonnet is attached to the body, and engageable to rotate the wheel in either direction, and wherein the wheel comprises a plurality of teeth spaced about an outer circumference of the wheel, and wherein the vent port bore is configured to receive an adjustment tool having a gear with teeth configured to mesh with the teeth of the wheel such that rotation of the adjustment tool causes a corresponding rotation of the wheel, the vent port bore also including an alignment structure that engages a corresponding alignment structure of the adjustment tool when the adjustment tool is inserted into the vent port bore to prevent lateral movement of the adjustment tool within the vent port bore.

21. A regulator in accordance with claim 20, wherein the bias force of the spring is increased by rotating the wheel in one direction and is decreased by rotating the wheel in the opposite direction.

22. A regulator in accordance with claim 20, wherein the piston includes an axial bore having an upper portion receiving the sleeve, and apertures placing the piston axial bore in fluid communication with a bottom surface of the piston, the piston being axially movable along the sleeve between a closed position with a shoulder of the piston axial bore engaging the sleeve and an open position with the shoulder disengaged from the valve seat, wherein the outlet port is in fluid communication with the piston bottom surface in both positions.

23. A regulator in accordance with claim 22, wherein a piston lower portion and a body lower portion engage in both piston positions with the body inner bore in fluid communication with the piston axial bore.

24. A regulator in accordance with claim 23, wherein the piston lower portion comprises a piston sleeve extending from the bottom surface of the piston and being disposed within and in a fluid sealing relationship with the body inner bore.

25. A regulator in accordance with claim 22, further comprising a further spring engaging the bottom surface of the piston and biasing the piston toward the closed position, and wherein the springs are configured so that the wheel may be rotated to a first position whereby the force applied by the first spring overcomes the force applied by the further spring to retain the piston in the open position, and the wheel may be rotated to a second position whereby the force applied by the further spring overcomes the force applied by the first spring to retain the piston in the closed position.

26. A regulator in accordance with claim 22, wherein the bonnet comprises an axial sleeve bore extending from the outlet port through the sleeve, and apertures placing the axial sleeve bore in fluid communication with the exterior of the sleeve.

27. A regulator in accordance with claim 26, wherein the outlet port is in fluid communication with the piston bottom surface in both piston positions via the piston apertures.

28. A regulator in accordance with claim 22, wherein the body comprises an inlet bore placing the inlet port in fluid communication with the body inner bore, and an outlet bore placing the outlet port in fluid communication with the body inner bore, and wherein the piston axial bore and apertures place the inlet port in fluid communication with the outlet port.

29. A regulator in accordance with claim 20, wherein the alignment structure of the vent port bore includes a bushing and the alignment structure of the adjustment tool includes an outwardly extending shaft, the bushing being configured to receive the outwardly extending shaft of the adjustment tool when the adjustment tool is inserted into the vent port bore.

30. A regulator in accordance with claim 20, wherein longitudinal axes of the body inner bore, the sleeve and the piston are coincident, and a longitudinal axis of the vent port bore is parallel to and offset from the coincident longitudinal axes of the body inner bore, the sleeve and the piston.

31. A regulator in accordance with claim 22, wherein the bonnet includes a threaded aperture extending between the outer surface of the bonnet and the inner surface proximate the wheel, the regulator comprising a set screw disposed in the threaded aperture of the bonnet and configured to engage the wheel to prevent rotation of the wheel about the tubular sleeve.

* * * * *